United States Patent
Boele

(10) Patent No.: US 6,752,363 B2
(45) Date of Patent: Jun. 22, 2004

(54) DEVICE FOR TILTABLE MOUNTING OF A DISPLAY SCREEN ON A WALL

(75) Inventor: Ronald Martijn Boele, Eindhoven (NL)

(73) Assignee: Vogel's Holding B.V., Eindhoven (NL)

( * ) Notice: Subject to any disclaimer, the term of this patent is extended or adjusted under 35 U.S.C. 154(b) by 0 days.

(21) Appl. No.: 10/349,730

(22) Filed: Jan. 22, 2003

(65) Prior Publication Data

US 2003/0136888 A1 Jul. 24, 2003

(30) Foreign Application Priority Data

Jan. 23, 2002 (NL) .............................................. 1019821

(51) Int. Cl.[7] .............................................. F16M 11/12
(52) U.S. Cl. .............................. 248/183.1; 248/184.1; 248/278.1; 248/919; 248/921; 248/922; 248/923
(58) Field of Search ................................ 248/919, 920, 248/921, 922, 923, 227.1, 183.1, 184.1, 186.2, 278.1, 284.1

(56) References Cited

U.S. PATENT DOCUMENTS

| 447,031 A | * | 2/1891 | Souder, Jr. et al. ............. 235/4 |
| 2,131,693 A | * | 9/1938 | Smith ........................... 355/67 |
| 4,690,362 A | * | 9/1987 | Helgeland .................... 248/404 |
| 4,691,886 A | * | 9/1987 | Wendling et al. ......... 248/183.1 |
| 4,706,920 A | * | 11/1987 | Ojima et al. ................. 248/371 |
| 5,743,503 A | * | 4/1998 | Voeller et al. ............ 248/284.1 |
| 5,941,493 A | * | 8/1999 | Cheng ......................... 248/371 |
| 6,015,120 A | | 1/2000 | Sweere et al. ......... 248/123.11 |
| 6,315,259 B1 | * | 11/2001 | Kolb ........................ 248/276.1 |
| 6,419,196 B1 | * | 7/2002 | Sweere et al. ........... 248/276.1 |

FOREIGN PATENT DOCUMENTS

DE 195 32 778 A1 3/1997

* cited by examiner

Primary Examiner—Ramon O. Ramirez
Assistant Examiner—Amy J. Sterling
(74) Attorney, Agent, or Firm—Ladas & Parry

(57) ABSTRACT

A device for tiltable mounting of a component, such as a display screen, on a wall, which device comprises a first part to be fixed to a wall, as well as a second part to which the component can be connected. Said parts are pivotally interconnected via a first pivot. The device furthermore comprises a spring which is pivotally connected to the second part with a first end via a second pivot and which is pivotally connected, via a third pivot, to the first part with a second end remote from said first end. The second part comprises a mounting surface which extends substantially parallel to a supporting surface extending through the first and second pivots.

8 Claims, 4 Drawing Sheets

DEVICE FOR TILTABLE MOUNTING OF A DISPLAY SCREEN ON A WALL

The invention relates to a device for tiltable mounting of a component, such as a display screen, on a wall, which device comprises a first part to be fixed to a wall, as well as a second part to which the component can be connected, which parts are pivotally interconnected via a first pivot, which device furthermore comprises a spring which is pivotally connected to the second part with a first end via a second pivot and which is pivotally connected, via a third pivot, to the first part with a second end remote from said first end, in which the distance between the first and the third pivot is adjustable.

Such a device, which is known from U.S. Pat. No. 6,015,120, is suitable for tiltable mounting of a display screen, such as a flat panel screen, to a horizontally or vertically extending wall.

With the device according to the aforesaid US patent, the second part comprises an arm which is pivotally connected to the wall-mounted first part via the first pivot. A spring is present between said arm and said first part. The arm is provided with a connecting piece at an end remote from the first pivot, which connecting piece pivotally connects the arm to the flat panel display screen. The spring provides a counterforce or counterweight for the display screen, so that any desired position of the arm is retained whilst enabling easy adjustment of the position of the display screen. The spacing between the first pivot and the third pivot to which the spring is connected can be adjusted in dependence on the weight of the display screen to be connected to the arm. This makes it possible to realise a desired counterweight for any weight of the display screen.

When the spacing between the first and a third pivot is correctly adjusted, the display screen will remain in a desired position to which it has been tilted as a result of the force exerted by the spring.

When using a flat panel display screen for television or video applications, it is desirable to have a possiblity to move the flat panel display screen from the position in which the display screen can be viewed from a desired angle to a storage position, in which the display screen substantially abuts against the wall.

With the device according to the aforesaid US patent, the arm is relatively long, inter alia in order to provide the desired distance for the spring extending between the second and the third pivot. Since the arm is relatively long, the arm will not be hidden from view by the display screen when the display screen is placed against the wall. As a result, the appearance of the unit is marred by the presence of the arm in the position in which the display screen abuts against the wall.

The object of the invention is to provide a device which is relatively compact, thus avoiding the drawbacks of the known devices.

This objective is accomplished with the device according to the invention in that the second part comprises a mounting surface which extends substantially parallel to a supporting surface extending through the first and second pivots.

The display screen can be mounted on said mounting surface, after which the display screen extends substantially parallel to a supporting surface extending through the first and the second pivots. As a result, the device abuts relatively closely against the display screen, so that a relatively compact construction is obtained, whilst the spring and the adjustable spacing between the first and the third pivot nevertheless make it possible to realise any desired counterweight upon tilting of the display screen.

One embodiment of the device according to the invention is characterized in that the spring is a gas spring.

Relatively great forces can be realised by means of a gas spring, as a result of which a relatively large counterweight can be provided in a simple manner.

Another embodiment of the device according to the invention is characterized in that a threaded element extends between the first and the third pivot, with the second end of the spring being connected to a threaded bush which rotatably surrounds the element.

The bush which rotatably surrounds the elements enables easy adjustment of the spacing between the first and a third pivot.

Yet another embodiment of the device according to the invention is characterized in that the bush is slidably supported in a slot.

As a result of the presence of the slot, the spacing between the second and the third pivot will change in a manner determined by the orientation of the slot when the spacing between the first and the third pivot changes.

Yet another embodiment of the device according to the invention is characterized in that a first end of the slot disposed near the first pivot is located further away from the second pivot than a second end of the slot remote from said first end.

Thus, the spring will be relatively long when the spacing between the first and the third pivot is relatively small, as a result of which the device will provide a relatively small counterweight. When the spacing between the first and the third pivot is increased, the spacing between the second and the third pivot will be reduced. As a result, the spring will be compressed. The greater spacing between the first and the third pivot in conjunction with the compressed spring enables the device to provide a relatively large counterweight.

Yet another embodiment of the device according to the invention is characterized in that the first part is pivotally connected to a first end of an arm, which arm can be pivotly mounted on a wall with a second end remote from said first end.

The pivoted arm provides greater freedom of movement of the first part and the second part connected thereto with respect to the wall.

The invention will be explained in more detail hereinafter with reference to the drawing, in which.

Like parts are indicated by the same numerals in the figures.

Figure 1:
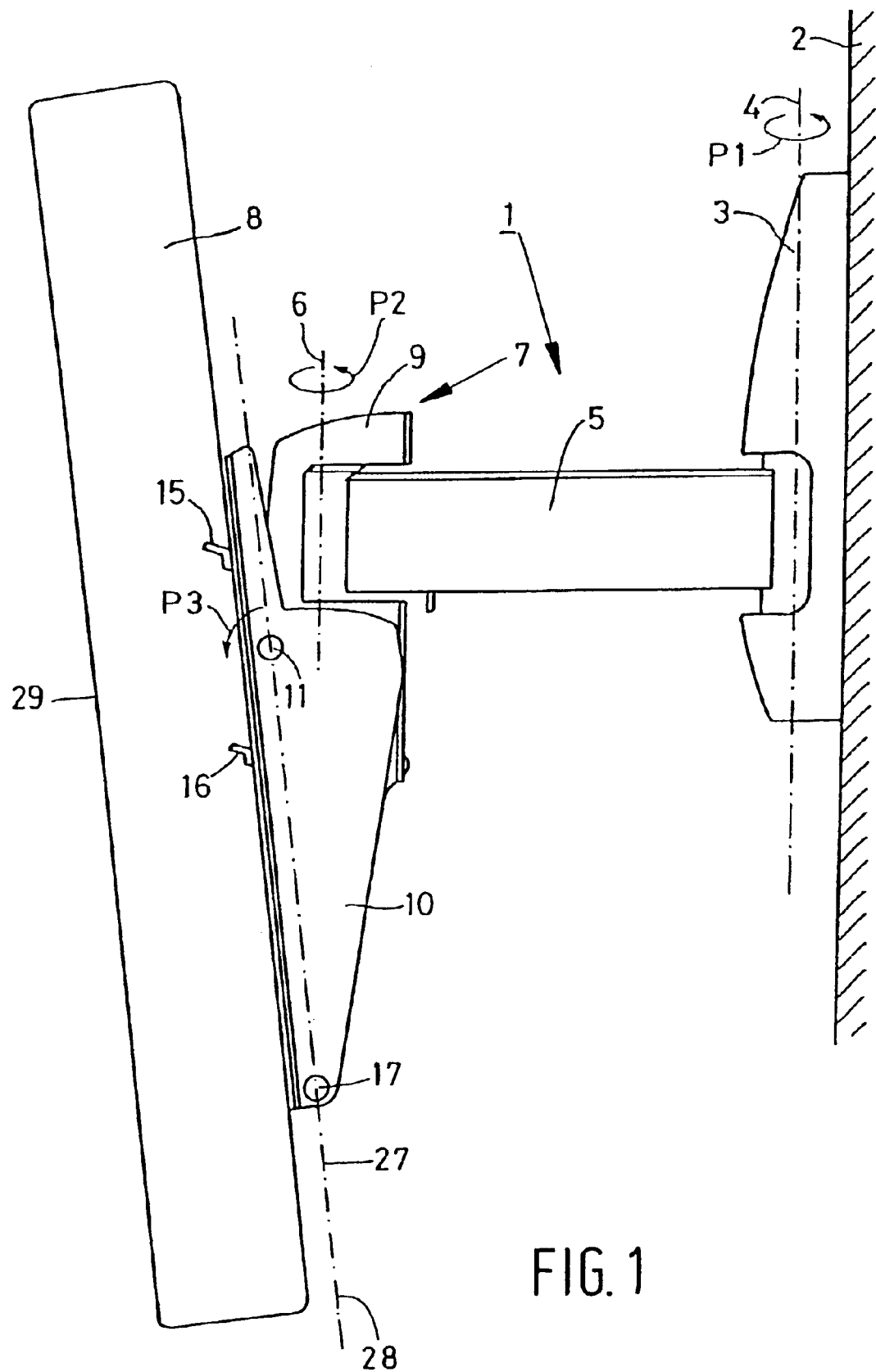
FIG. 1 is a side elevation of a device according to the invention, which is provided with a flat panel display screen.

FIG. 1 shows a device 1 according to the invention, comprising a holder 3 which can be fixed to a wall 2, an arm 5 connected to the holder 3, which is capable of pivoting movement about a vertically extending pivot 4 in the direction indicated by the arrow P1 and in the opposite direction, as well as a tilting mechanism 7 connected to the arm 5, which is capable of pivoting movement about a vertically extending pivot 6 in the direction indicated by the arrow P2 and in the opposite direction.

The tilting mechanism 7 comprises a first part 9, which is pivotally connected to the arm 5 via the pivot 6. The tilting mechanism 7 further comprises a second part 10, which is connected to the first part 9, being pivotable about a first pivot 11 in the direction indicated by the arrow P3 and in the opposite direction.

The pivot 11 extends in horizontal direction.

Figure 3:
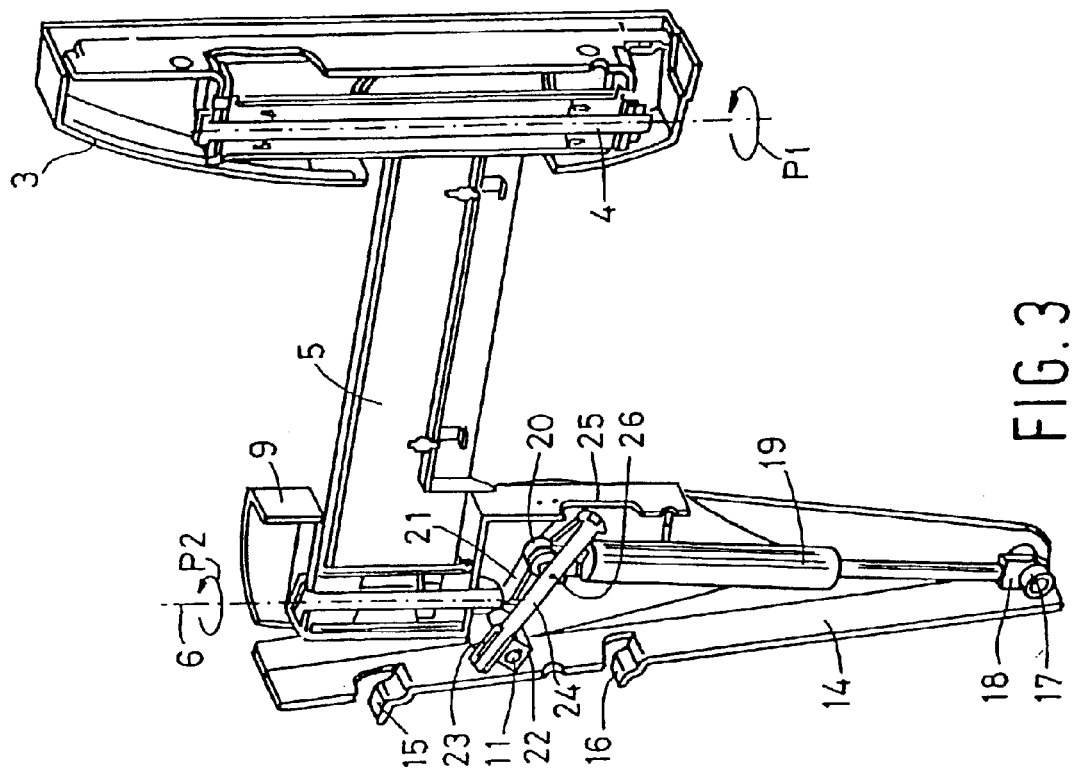
FIG. 3 is a cross-sectional view of the device of FIG. 2.
Figure 2:
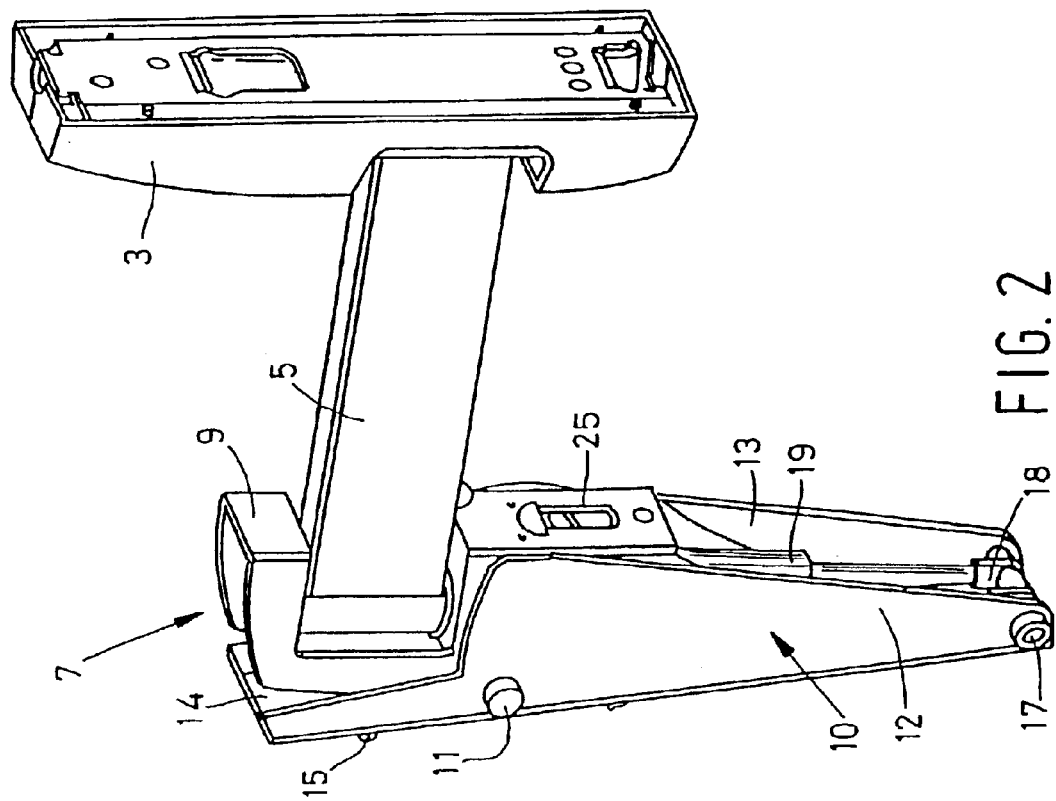
FIG. 2 is a perspective rear view of the device of FIG. 1.

The tilting mechanism 7 will now be explained in more detail with reference to FIGS. 2 and 3.

The second part 10 is U-shaped and comprises two parallel leg members 12, 13 and a bridge member 14 interconnecting said leg members 12, 13. The leg members 12, 13 are disposed on either side of the first part 9. The bridge member 14 comprises two hook-shaped elements 15, 16, to which the display screen 8 can be attached. The second part 10 comprises a second pivot 17 which is spaced from the pivot 11 by some distance. Like the pivot 11, the pivot 17 extends between the two bridge members 12, 13. One end 18 of a gas spring 19 is pivotally connected to the pivot 17. The gas spring 19 is provided with a bush 20 at a side remote from the end 18. The bush 20 is provided with internal screw thread. The bush 20 is slidably supported in a slot 21 present in the first part 9. An element 22 provided with a recess 23 pivots about the pivot 11. A threaded stud 24 extends between the bush 20 and the element 22, which stud is rotatably journalled in the recess 23. The first part 9 comprises an opening 25, through which a tool, such as a screwdriver, can be passed. The screwdriver can be used for rotating the stud 24 about its longitudinal axis, as a result of which the internally threaded bush 20 is moved over the stud 24. During the movement of the bush 20 in the direction of the first pivot 11, the bush 11 moves through the slot 21. The slot 21 is slightly curved, the spacing between the slot 21 and the second pivot 17 being greater near the first pivot 11 than at an end of the slot 21 remote from the pivot 11.

The bush 20 forms the third pivot 26 of the tilting mechanism 7. Consequently, rotation of the stud 24 will cause the third pivot 26 to move towards the first pivot 11 or away therefrom.

A supporting surface 27 can be defined through the pivots 11, 17. Said supporting surface 27 is indicated in FIG. 1. The bridge member 14 of the second part 10 defines a mounting surface 28, which extends substantially parallel to the supporting surface 27, at a relatively short distance therefrom. The display screen 8, which is connected to the second part 10 by means of the hook-shaped elements 15, 16 extends parallel to the mounting surface 28 with a front side 29 facing away from the device 1.

The display screen 8 is pivoted about the vertically extending pivots 4, 6 and/or about the horizontally extending pivot 11 in dependence on the position of the display screen 8 that is required by a user. A desired counterforce will be provided by the gas spring 19, as a result of which any tilted position of the display screen 8 will be retained.

The desired counterforce provided by the gas spring 19 depends on the weight of the display screen 8 as well as on the position of the centre of gravity of the display screen 8.

Since said weight as well as said position of the centre of gravity may vary, it is possible to adjust the spacing between the first and third pivots 11, 26.

This will be explained in more detail with reference to FIGS. 4A–4C, in which only the tilting mechanism 7 is shown.

Figure 4A:
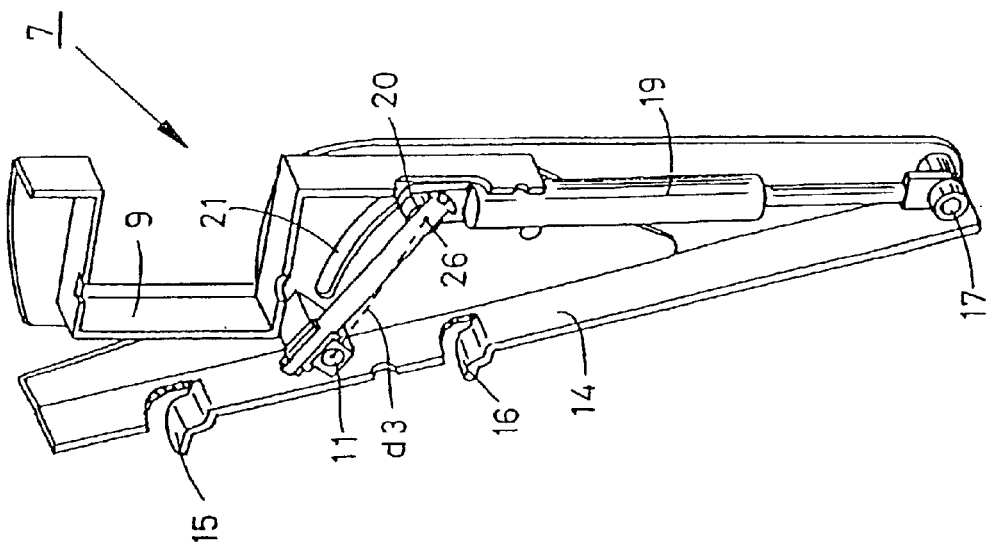
FIGS. 4A–4C show various positions of the device of FIG. 1 with different weights of the display screen.

In the position that is shown in FIG. 4A, the bush 21 is positioned relatively close to the first pivot 11. The third pivot 26 defined by the bush 20 is spaced from the first pivot 11 by a distance d1 in this position.

In the position that is shown in FIG. 4A, the third pivot 26 is spaced from the pivot 17 by a relatively large distance, and the gas spring 19 is slightly extended in this position. As a result of the relatively great length of the gas spring 19 as well as the relatively small distance d1 between the first and third pivots 11, 26, the tilting mechanism 7 provides only a relatively small counterweight for a display screen to be connected to the tilting mechanism 7. Think of a weight of 30 kg, for example, and a distance from the centre of gravity of the display screen of about 7 cm in this connection.

Figure 4B:
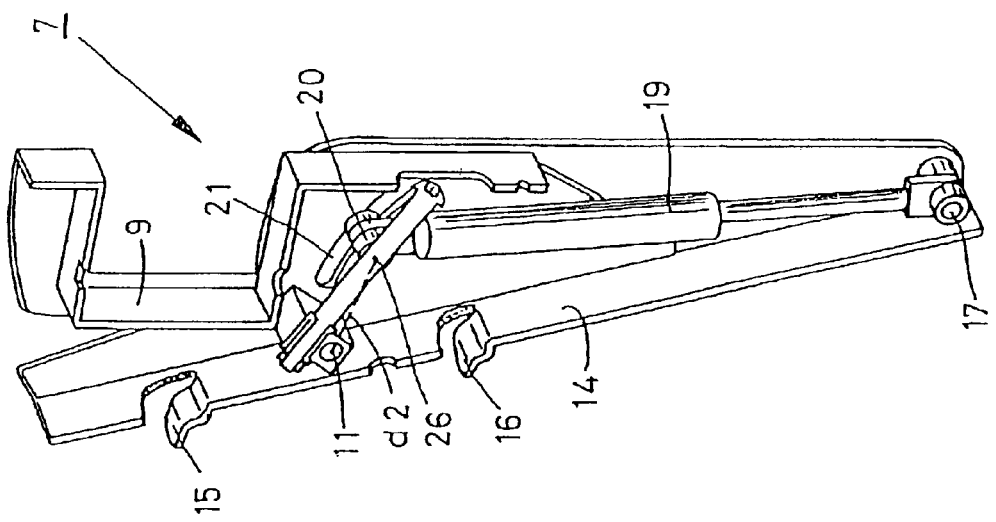

In the situation that is shown in FIG. 4B, the bush 20 and the pivot 26 defined by said bush are spaced from the first pivot 11 by a distance d2, in which situation the spacing between the bush and the second pivot 17 is smaller than in the position that is shown in FIG. 4A. The slightly compressed gas spring 19 and the greater distance d2 from the first pivot 11 render the tilting mechanism that is shown in FIG. 4B suitable for providing a counterweight to a display screen of, for example, 45 kg.

Figure 4C:
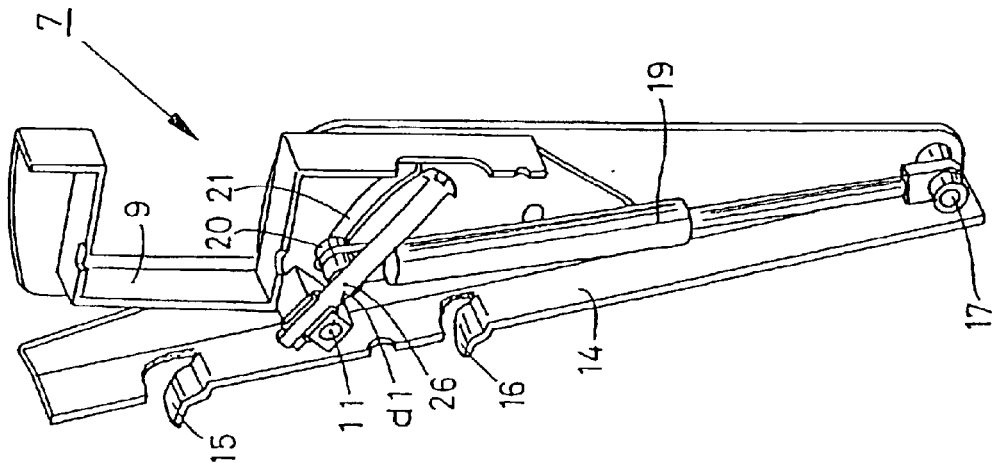

In the position that is shown in FIG. 4C, the bush 20 is located near an end of the slot 21 remote from the pivot 11. The third pivot is spaced from the first pivot 11 by a distance d3. The gas spring 19 is compressed relatively far in this position. As a result, the tilting mechanism 7 that is shown in FIG. 4C is capable of providing a relatively great counterweight of, for example, 60 kg in the case of a distance from the centre of gravity of the display screen to the bridge member 14 of, for example, 15 cm.

It will be understood that any desired counterweight can be realised through a suitable selection of the gas spring 19 and the distances between the various pivots 11, 17, 26.

Figure 5C:
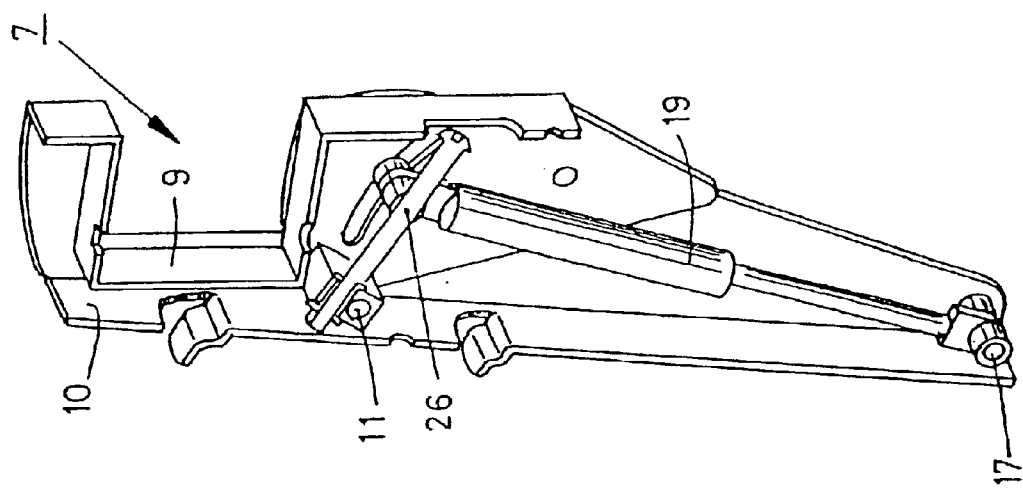
FIGS. 5A–5C show various positions of the device of FIG. 1 with different tilting angles of the display screen.
Figure 5B:
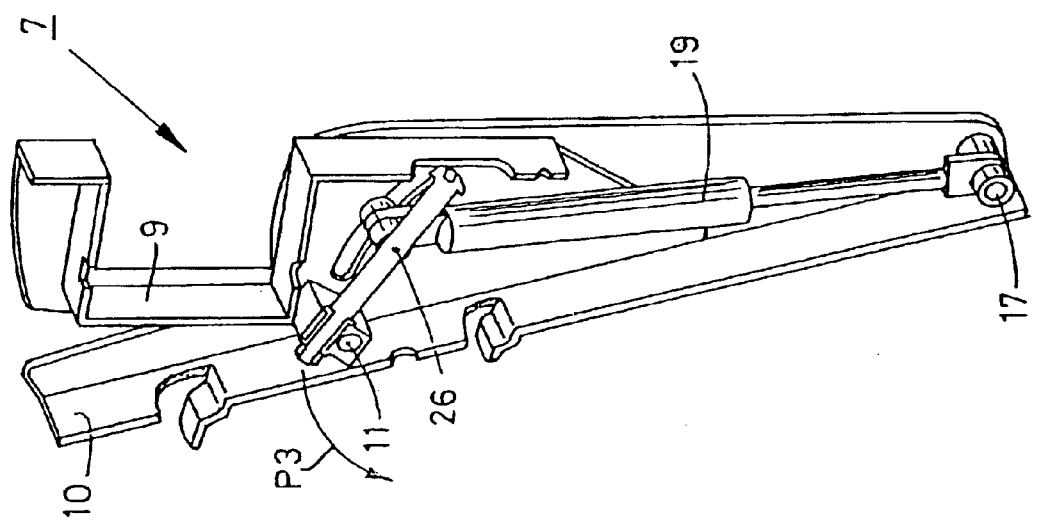
Figure 5A:
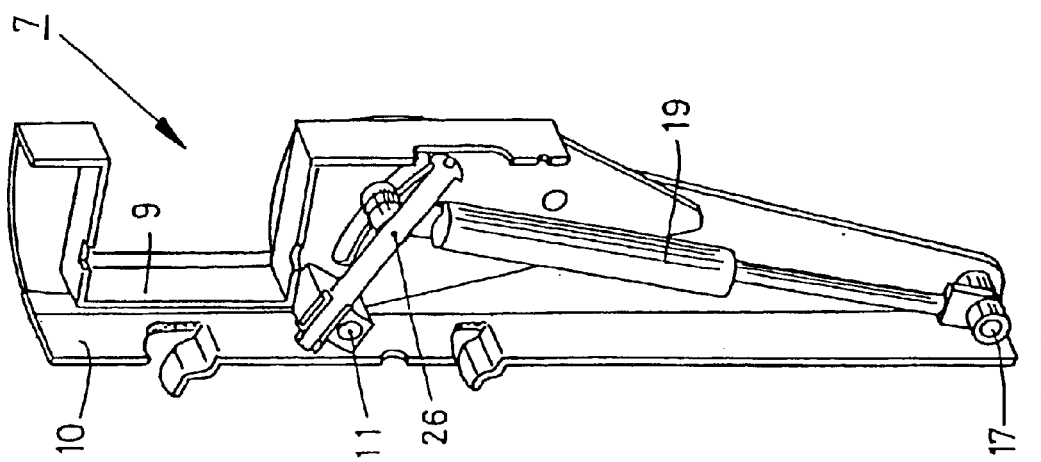

In the positions of the tilting mechanism 7 that are shown in FIGS. 5A–5C, the second part 10 has tilted with respect to the first part 9 whilst the distance between the first and the third pivots 11, 26 has remained the same, as a result of which the second part 10, and consequently the display screen connected thereto, includes an angle of, respectively, 15°, 0° and −5° with the vertical. If the distance between the pivots 11, 26 is correctly adjusted, the tilting mechanism 7 will maintain any adjusted position thereof.

It is also possible to use a number of gas springs arranged side by side instead of a single gas spring, or to use spiral springs, for example.

What is claimed is:

1. A device for tiltable mounting of a component, such as a display screen, on a wall, which device comprises a first part to be fixed to a wall, as well as a second part to which the component can be connected, which parts are pivotally interconnected via a first pivot, which device further comprises a spring which is pivotally connected to the second part with a first end via a second pivot and which is pivotally connected, via a third pivot, to the first part with a second end remote from said first end, in which the distance between the first and the third pivot is adjustable, characterized in that the second part comprises a mounting surface which extends substantially parallel to a supporting surface extending through the first and second pivots.

2. A device according to claim 1, characterized in that said spring is a gas spring.

3. A device according to claim 1, characterized in that a threaded element extends between the first and the third pivot, with the second end of the spring being connected to a threaded bush which rotatably surrounds the element.

4. A device according to claim 3, characterized in that said bush is slidably supported in a slot.

5. A device according to claim 4, characterized in that a first end of the slot disposed near the first pivot is located further away from the second pivot than a second end of the slot remote from said first end.

6. A device according to claim 1, characterized in that the first part is pivotally connected to a first end of an arm, which arm can be pivot-mounted on a wall with a second end remote from said first end.

7. A device according to claim 1, characterized in that the connecting element present on the second part comprises at least one hook.

8. The device according to claim 1, wherein the first pivot, the second pivot and the third pivot extend parallel to each other.

* * * * *